(12) United States Patent
Soma

(10) Patent No.: US 9,462,161 B2
(45) Date of Patent: Oct. 4, 2016

(54) IMAGE FORMING APPARATUS AND METHOD CORRECTING AREA RATIO OF EACH TONER IN STREAKED AREA ACCORDING TO CALCULATED FLUCTUATIONS

(71) Applicant: Takashi Soma, Kanagawa (JP)

(72) Inventor: Takashi Soma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/887,836

(22) Filed: Oct. 20, 2015

(65) Prior Publication Data
US 2016/0132013 A1 May 12, 2016

(30) Foreign Application Priority Data

Nov. 7, 2014 (JP) .................................. 2014-227492

(51) Int. Cl.
| | |
|---|---|
| *H04N 1/60* | (2006.01) |
| *G03G 15/01* | (2006.01) |
| *G03G 15/00* | (2006.01) |
| *H04N 1/00* | (2006.01) |

(52) U.S. Cl.
CPC ............ *H04N 1/6027* (2013.01); *G03G 15/01* (2013.01); *G03G 15/5062* (2013.01); *G03G 15/55* (2013.01); *H04N 1/00015* (2013.01); *H04N 1/00023* (2013.01); *H04N 1/00034* (2013.01); *H04N 1/00068* (2013.01); *H04N 1/00082* (2013.01); *H04N 1/60* (2013.01); *H04N 1/603* (2013.01); *H04N 1/6041* (2013.01)

(58) Field of Classification Search
None
See application file for complete search history.

(56) References Cited

U.S. PATENT DOCUMENTS 8,938,174 B2 * 1/2015 Hirata ................ G03G 15/5062
399/49
2013/0108292 A1 5/2013 Suzuki et al.

FOREIGN PATENT DOCUMENTS

| JP | 2011-257709 | 12/2011 |
|---|---|---|
| JP | 2013-097237 | 5/2013 |

* cited by examiner

*Primary Examiner* — Scott A Rogers
(74) *Attorney, Agent, or Firm* — Harness, Dickey & Pierce, P.L.C.

(57) ABSTRACT

An image forming apparatus and an image forming method are provided. The image forming apparatus includes a processor, and each of the processor of the image forming apparatus and the image forming method includes obtaining an output image of a primary color and a secondary color that is formed on a recording medium based on an image having an area ratio of each toner being uniform over the recording medium, obtaining spectral reflectance of the output image in a main scanning direction, obtaining spectral reflectance of a primary-color solid-fill image and the recording medium stored in a memory, calculating fluctuations in area ratio of each toner of a streaked area of the output image using the spectral reflectance of the streaked area and a streak-free area of the output image, and correcting an area ratio of each toner in the streaked area of image data to be output.

20 Claims, 6 Drawing Sheets

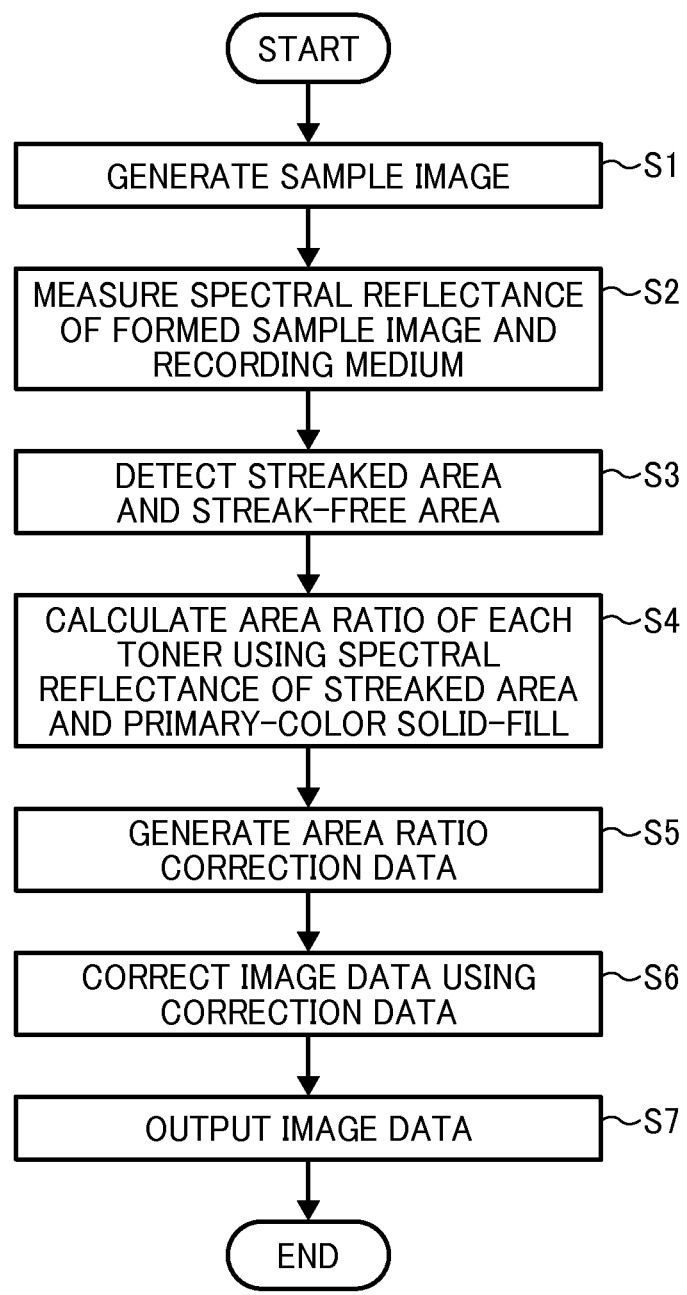

FIG. 8

$$R = \prod_{i=c,m,y,k} \left\{ \alpha_i \times R_i^{1/n} + (1-\alpha_i) \times R_w^{1/n} \right\}^n$$

R: REFLECTANCE OF STREAKED AREA $\alpha_c, \alpha_m, \alpha_y, \alpha_k$: AREA RATIO OF CYAN, MAGENTA, YELLOW, AND BLACK TONER $R_c, R_m, R_y, R_k$: SPECTRAL REFLECTANCE OF CYAN, MAGENTA, YELLOW, AND BLACK SOLID-FILL $R_w$: SPECTRAL REFLECTANCE OF RECORDING MEDIUM n: YULE-NIELSEN FACTOR

FIG. 9

$$\alpha = \alpha_{in} \times \frac{\alpha_{in}}{\alpha_{cal}}$$

$\alpha$ : CORRECTED AREA RATIO
$\alpha_{in}$ : ORIGINALLY INPUT AREA RATIO
$\alpha_{cal}$: CALCULATED AREA RATIO

FIG. 10

$$\alpha = \alpha_{in} \times \frac{\alpha_{ref}}{\alpha_{cal}}$$

$\alpha$ : CORRECTED AREA RATIO
$\alpha_{in}$ : ORIGINALLY INPUT AREA RATIO
$\alpha_{ref}$: CALCULATED AREA RATIO OF STREAK-FREE AREA
$\alpha_{cal}$: CALCULATED AREA RATIO OF STREAKED AREA

FIG. 11

$$\alpha = \alpha_{in} \times \frac{R_{ref}}{R_{line}}$$

$\alpha$ : CORRECTED AREA RATIO
$\alpha_{in}$ : ORIGINALLY INPUT AREA RATIO
$R_{ref}$: MEASURED REFLECTANCE OF STREAK-FREE AREA
$R_{line}$: MEASURED REFLECTANCE OF STREAKED AREA

IMAGE FORMING APPARATUS AND METHOD CORRECTING AREA RATIO OF EACH TONER IN STREAKED AREA ACCORDING TO CALCULATED FLUCTUATIONS

CROSS-REFERENCE TO RELATED APPLICATION

This patent application is based on and claims priority pursuant to 35 U.S.C. §119(a) to Japanese Patent Application No. 2014-227492, filed on Nov. 7, 2014, in the Japan Patent Office, the entire disclosure of which is hereby incorporated by reference herein.

BACKGROUND

1. Technical Field

Embodiments of the present invention relate to an image forming apparatus and an image forming method.

2. Background Art

In electrophotographic image forming apparatuses, the stability of the colors of the output image is critical. With good color stability, an image is output with the desired density and area ratio. When the density of an output image is significantly different from that of the input image data, such an output image is considered defective. For this reason, a technology that corrects the image data to be output upon measuring the output images is known in the art.

For example, a method of correcting light quantity and image data based on the density data of a formed sample image, for the purpose of controlling a defective image caused by variability of the density, is known. In that method, firstly, a sample image of a prescribed density range is formed, and the density of the sample image is measured. Then, correction data is calculated from the measured density data in the main scanning direction.

SUMMARY

Embodiments of the present invention described herein provide an image forming apparatus and an image forming method. The image forming apparatus includes a processor, and each of the processor of the image forming apparatus and the image forming method includes obtaining an output image of a primary color and a secondary color that is formed on a recording medium based on an image having an area ratio of each toner being uniform over the recording medium, obtaining spectral reflectance of the output image in a main scanning direction, obtaining spectral reflectance of a primary-color solid-fill image and the recording medium stored in a memory, calculating fluctuations in area ratio of each toner of a streaked area of the output image using the spectral reflectance of the streaked area and a streak-free area of the output image, and correcting an area ratio of each toner in the streaked area of image data to be output according to the fluctuations in area ratio.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 7 is a flowchart of the correction applied to image data according to an embodiment of the present invention.

FIG. 8 is a formula indicating the relational expression of reflectance and an area ratio, according to an embodiment of the present invention.

FIG. 9 is a first correction formula according to an embodiment of the present invention.

FIG. 10 is a second correction formula according to an embodiment of the present invention.

FIG. 11 is a third correction formula according to an embodiment of the present invention.

Figure 1:
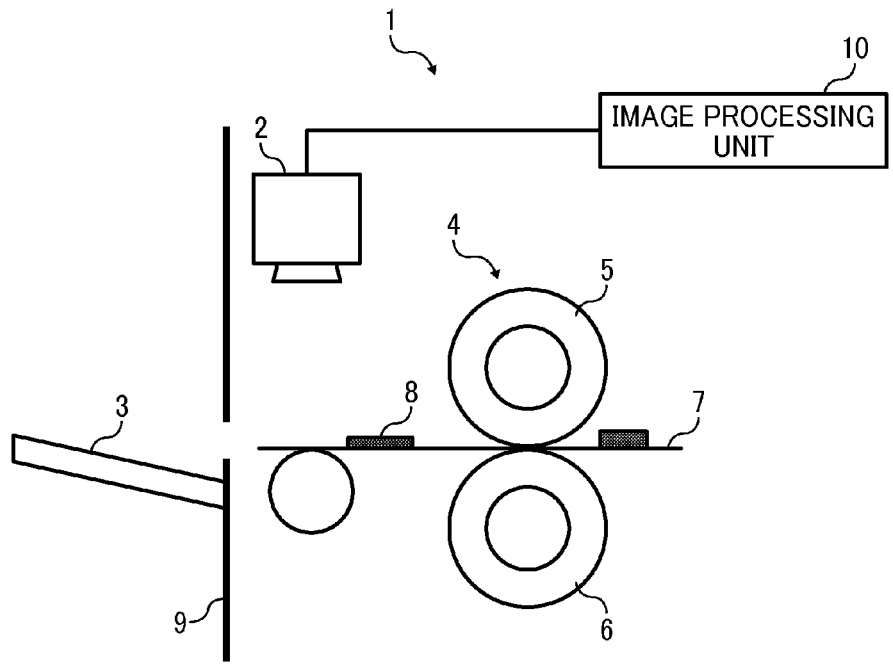
FIG. 1 is a schematic diagram illustrating a part of the structure of an image forming apparatus according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

An embodiment of the present invention is described below in detail with reference to the drawings.

FIG. 1 is a schematic diagram illustrating a part of the structure of the image forming apparatus 1 according to the present embodiment. The image forming apparatus 1 may be any image forming apparatus capable of forming an image, such as the apparatus disclosed in US Patent Application Publication No. 2014/0152754, the entire of which is incorporated herein by reference. The image forming apparatus 1 is provided with, for example, a line spectrometer 2 between a paper output tray 3 and a fixing unit 4. Due to this arrangement, the line spectrometer 2 can measure an image that has gone through fixing processes in electrophotography. The fixing unit 4 includes a fixing roller 5 and a pressure roller 6, and fixes an image 8 on a recording medium 7. The paper output tray 3 is attached to an exterior component 9, such as a case, of the image forming apparatus 1.

The image processing unit 10 is connected to the line spectrometer 2, and the data that is measured by the line spectrometer 2 is processed by the image processing unit 10. In the present embodiment, the position at which the measuring instrument is disposed is not limited to the position described above, and the measuring instrument may be arranged, for example, on the side of the paper output tray 3. Moreover, the measuring instrument is not limited to the line spectrometer, but may be any device as long as it can obtain the spectral information in the main scanning direction.

Figure 2:
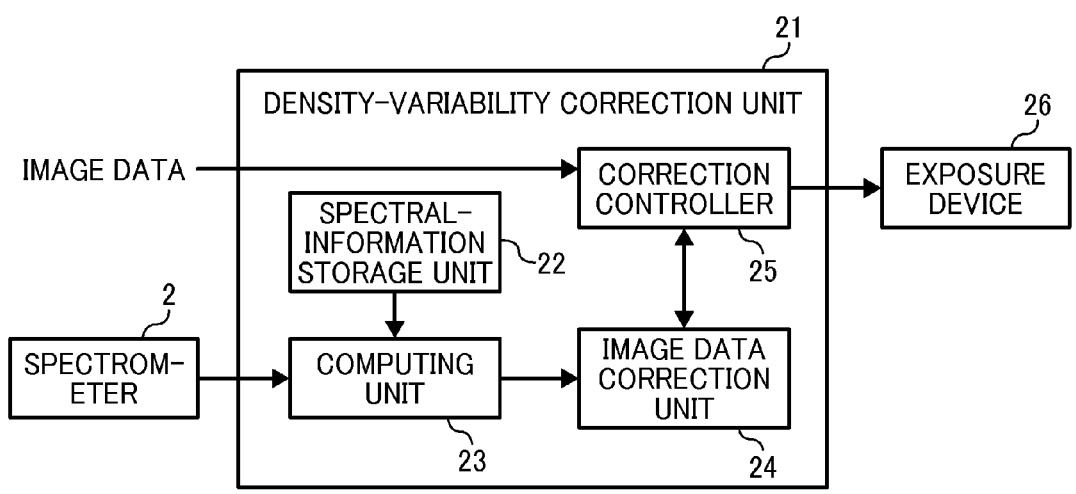
FIG. 2 is a block diagram of a density-variability correction unit according to an embodiment of the present invention.

FIG. 2 is a block diagram of a density-variability correction unit 21 according to the present embodiment. The density-variability correction unit 21 includes a spectral-information storage unit 22, a computing unit 23, an image data correction unit 24, and a correction controller 25.

The spectral-information storage unit 22, which may be implemented by any desired memory, stores spectral information of the primary-color solid-fill and recording medium, which may be previously obtained or newly obtained from the formed image by the line spectrometer 2. The spectral-information storage unit 22 further stores the spectral information of the sample image measured by the spectrometer 2. The computing unit 23 calculates and obtains data required to generate correction data using the spectral information of the sample image and the spectral information of the primary-color solid-fill and recording medium, which are stored in the spectral-information storage unit 22. The image data correction unit 24 uses the obtained data to generate correction data, and the correction controller 25 uses the generated correction data to correct image data to be output. Subsequently, the corrected image data is sent to an exposure device 26, such that an image is formed based on the corrected image data. In the present embodiment, any of the above-described devices or units of the density-variability correction unit 21 can be implemented as a hardware apparatus, such as a special-purpose circuit or device, or as a hardware/software combination, such as a processor executing a software program.

In one example, the density-variability correction unit 21 may be implemented by the image processing unit 10 incorporated in the image forming apparatus 1. More specifically, the image processing unit 10 includes a processor such as a CPU, and a memory such as a random-access memory (RAM).

Figure 3:
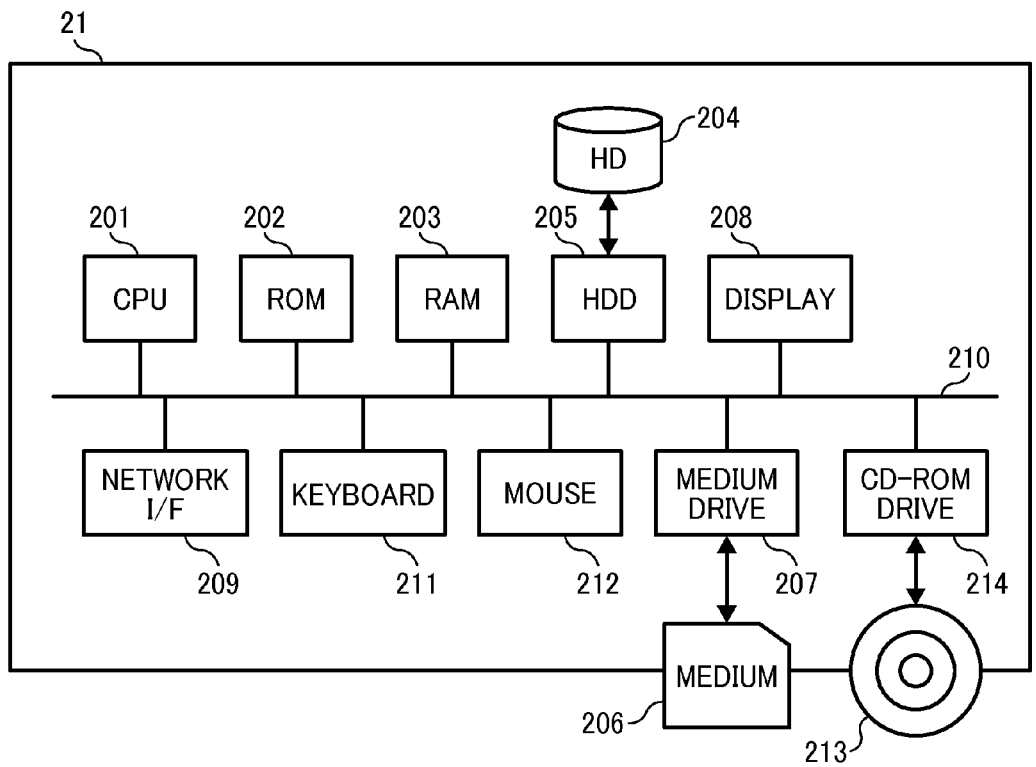
FIG. 3 illustrates a hardware structure of density-variability correction unit according to an embodiment of the present invention.

In another example, the density-variability correction unit 21 may be implemented by a computer, which may be provided separately from the image forming apparatus 1. FIG. 3 illustrates a hardware structure of density-variability correction unit 21 in such a case. The density-variability correction unit 21 includes a central processing unit (CPU) 201, a read only memory (ROM) 202, a RAM 203, a hard drive (HD) 204, a hard disk drive (HDD) 205, a medium drive 207, a display 208, a network interface (I/F) 209, a keyboard 211, a mouse 212, and a CD-ROM drive 214, which are electrically connected through a bus 210 such as an address bus or a data bus. The CPU 201 controls entire operation of the density-variability correction unit 21. The ROM 202 stores a control program for execution by the CPU 201, such as the IPL. The RAM 203 functions as a work area of the CPU 201. The HD 204 stores therein various data such as a density-variability correction program. The HDD 205 controls reading or writing of various data with respect to the HD 204 under control of the CPU 201. The medium drive 207 controls reading or writing of various data with respect to a removable recording medium 206 such as a flash memory. The display 208 displays various data such as a cursor, menu, window, character, or image. The network I/F 209 allows the management system 50 to transmit data through the communication network 2. The keyboard 211 includes a plurality of keys, each of which is used for inputting a user instruction through a character, a numeral, or a symbol. The mouse 212 allows the user to input a user instruction including, for example, selection or execution of a specific instruction, selection of an area to be processed, and instruction of cursor movement. The CD-ROM drive 214 controls reading or writing of various data with respect to a CD-ROM 213. In alternative to the CD-ROM 213, any removable recording medium may be used. The density-variability correction program may be written onto a recording medium that is readable by a general-purpose computer such as the recording medium 206 or the CD-ROM 213 in any format that is installable or executable by the general-purpose computer. Once the density-variability correction program is written onto the recording medium, the recording medium may be distributed. Further, the density-variability correction program may be stored in any desired memory other than the HD 204, such as the ROM 202. While the keyboard 211, the mouse 212, and the display 208 are provided for the density-variability correction unit 21 in the example of FIG. 3, such elements may not be provided if the density-variability correction unit 21 is implemented by a server.

In example operation, the density-variability correction unit 21 receives various data from the line spectrometer 2 through the network I/F 209, which connects with a network I/F provided in the image forming apparatus 1, to generate correction data. The correction data is then sent to the image forming apparatus 1 to form an image.

Figure 4:
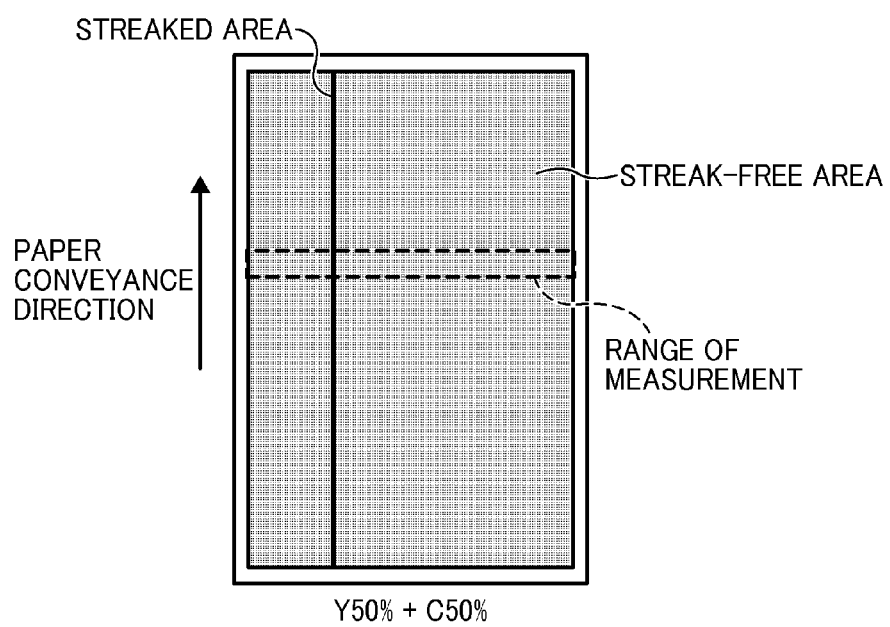
FIG. 4 is a diagram illustrating a formed sample and its range of measurement, according to an embodiment of the present invention.

FIG. 4 is a diagram illustrating a sample image and a range of measurement according to the present embodiment. As a sample image, as illustrated in FIG. 4 for example, a color-mixture image that is formed on a sheet of paper with the area ratio of Y: 50% and C: 50%. The colors of toners and the area ratios that are used in the present embodiment are not limited to the ones described above, but any desired color or area ratio may be used. In order to measure the spectral reflectance in the main scanning direction, for example, a portion of 10-mm strip that is in the middle of the sheet in the paper conveyance direction is set to be a range of measurement. As a matter of course, the range of measurement is not limited to this example, and the entire sheet may be measured.

Figure 5A:
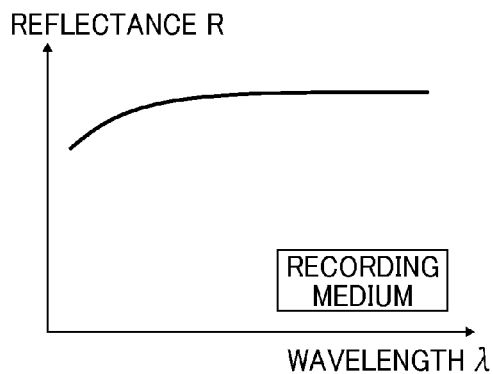
FIG. 5A, FIG. 5B, and FIG. 5C are diagrams each illustrating an example of the spectral reflectance of the images used for calculation, according to an embodiment of the present invention.
Figure 5B:
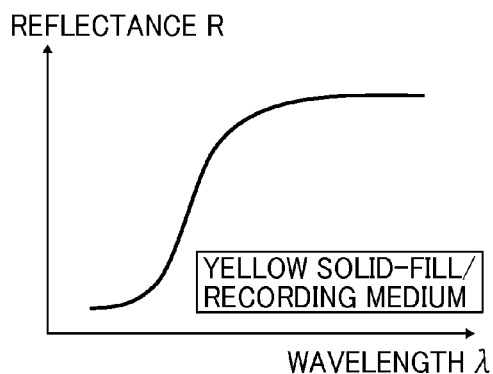
Figure 5C:
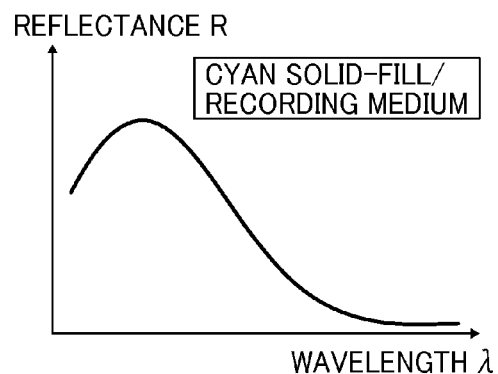

FIG. 5A, FIG. 5B, and FIG. 5C are diagrams each illustrating an example of the spectral reflectance of the images used for the calculation. More specifically, an example of the spectral reflectance of the primary-color solid-fill (yellow and cyan) and recording medium used for the calculation is illustrated in FIG. 5A, FIG. 5B, and FIG. 5C. Calculation is performed by substituting the reflectance of each wavelength in a formula as depicted in FIG. 8. The formula depicted in FIG. 8 will be described later.

Figure 6:
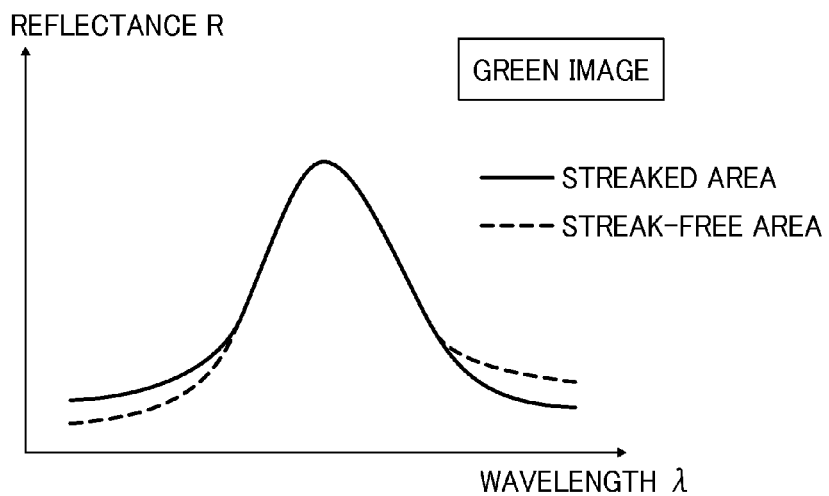
FIG. 6 is a diagram illustrating an example of the spectral reflectance of an image of a secondary color, according to an embodiment of the present invention.

FIG. 6 is a diagram illustrating an example of the spectral reflectance of an image of a secondary color, according to the present embodiment. More specifically, FIG. 6 illustrates an example of the spectral reflectance of streaked area and streak-free area of a green image. The measured spectral reflectance is divided into sections in the main scanning direction, and the sections are compared with each other in terms of the spectral reflectance. Accordingly, a streaked area and a streak-free area can be detected. In the present embodiment, a method of calculating, based on the reflectance, a parameter that is directly used for correction data is described.

In an example of the green image, the measured values of the reflectance of about 640 nm and 440 nm for cyan and yellow, which are the absorption bands of cyan and yellow, respectively, are used. For example, when the area ratio of cyan is greater and the area ratio of yellow is smaller in a streaked area than in a streak-free area, the amount of absorption with 640-nm band becomes large and the amount of absorption with 440-nm band becomes small.

As a result, the wavelength distribution as illustrated in FIG. 6 is obtained. Accordingly, the fluctuations in the area ratio of each toner can be detected by selecting and using the wavelength data suited to each color. For example, correction data can be generated by substituting the as-is measured data into a formula as depicted in FIG. 11. The formula depicted in FIG. 11 will be described later.

According to the present embodiment, the spectral reflectance of color mixture is measured in addition to the density data of a single color. Accordingly, the differences in the efficiency of transfer between a one-color condition and a color-mixture condition and the fluctuations in area ratio of color mixture caused by deterioration of a photoconductor and fixing unit component are calculated to correct the area ratio in a color-mixture condition. As a result, production of defective images due to density variability of a single color is minimized and production of defective images due to density variability of color mixture caused by reducing the density variability of the single color can also be minimized.

FIG. 7 is a flowchart of the correction applied to image data according to the present embodiment. Steps of correcting image data performed by the density-variability correction unit 21 are described. In step S1, a sample image in which the area ratio is uniform is generated.

When the area ratio herein is uniform, the areas that are occupied by each toner are approximately equivalent to each other in any given area. For example, when a sample has the area ratio of Y: 50% and C: 50% as illustrated in FIG. 4, any area of the sample image has that area ratio. Note that the color and area ratio of a generated sample image are not limited to the above example. For example, a sample image may have the color mixture of Y: 70% and M: 40% or the color mixture of Y: 30%, M: 30%, and C: 40%.

In step S2, the density-variability correction 21 obtains the spectral reflectance of the formed sample image and the spectral reflectance of a recording medium that are measured. The spectral reflectance of the image generated in step S1 and the spectral reflectance of a recording medium in use are measured in the main scanning direction, for example, by using the line spectrometer 2 installed in the image forming apparatus 1. It is to be noted that the measuring instrument is not limited to a line spectrometer, and a generated sample image may manually be measured using a spectrophotometric colorimeter.

In step S3, based on the data of the spectral reflectance obtained in step S2, a streaked area and a streak-free area are detected, for example, as described above referring to FIG. 6. Firstly, the average of the spectral reflectance in the main scanning direction is calculated. Secondly, the main scanning direction is divided into a plurality of areas. Upon determining a prescribed value (for example, 1.0 indicating the sum total of the absolute values of the differences among wavelengths), when the difference between the spectral reflectance of each area and the average spectral reflectance (for example, the difference between the measured spectral reflectance of each wavelength band and the average spectral reflectance when the wavelength band of the measured spectral reflectance is ranging from 400 to 700 nanometer (nm) and the spectral reflectance is measured at 10 nm intervals) is equal to or greater than the prescribed value, the areas are determined to be a streaked area. When the difference is less than the prescribed value, the areas are determined to be a streak-free area.

Note that in the present embodiment, a method of detecting a streaked area and a streak-free area is not limited to the method described above. For example, a streaked area and a streak-free area may be detected without calculating an average. For example, when the spectral reflectance of each of the areas in the main scanning direction is calculated and the sum total of the differences between an area A and an area B and the sum total of the differences between the area B and an area C are 1.2 and 1.1, respectively, the area B may be determined to be a streaked area while the area A and the area C are determined to be streak-free areas.

Alternatively, detection may be performed using values other than the values of spectral reflectance, for example, the values of $\Delta E$ that is known as the measure of a color difference. For example, the measured spectral reflectance is converted into $L^*a^*b^*$ using any known transformation to calculate the average $L^*a^*b^*$ in the main scanning direction. Secondly, the main scanning direction is divided into a plurality of areas, and $\Delta E$ is calculated for each of the areas in the main scanning direction based on the average $L^*a^*b^*$. When the obtained $\Delta E$ for a certain area is equal to or greater than a prescribed value, for example, $\Delta E > 3.0$, the area is determined to be a streaked area. On the other hand, when the obtained $\Delta E$ for a certain area is less than the prescribed value, for example, $\Delta E < 3.0$, the area is determined to be a streak-free area.

An area in which a streaked area arises may roughly be detected using a method as described above. However, in order to determine an actual area to be corrected, it is desired that detection be performed on a finer area. Such a finer area to be corrected may be determined as follows. For example, the roughly detected area, which is obtained using the method as described above, is further divided into 0.5 mm intervals, and the difference between the spectral reflectance of each area and the average spectral reflectance is calculated again.

Differences are calculated from an edge to the other edge of the areas, and a point where the difference with a neighboring area exceeds a threshold is determined to be a point of division A. Differences are further calculated from the point of division A, and a point where the difference with a neighboring area exceeds the threshold again is determined to be a point of division B. The area between the point of division A and the point of division B is determined to be an area to be corrected. This method enables detection even when there are a plurality of fine streaked areas in a detection field. Alternatively, a color difference as described above may be used to detect an area to be corrected, in place of the spectral reflectance.

In step S4, the area ratio of each toner is calculated using the spectral reflectance of the streaked area and primary-color solid-fill. In other words, the measured spectral-reflectance data is used to calculate the area ratio of each toner in the streaked area detected in the step S3.

As a method of calculation, for example, the color prediction formula as depicted in FIG. 8 is used. FIG. 8 is a formula indicating the relational expression of reflectance and an area ratio, according to the present embodiment. Such a formula may be used for any recording medium. In using the formula, the spectral-reflectance data of primary-color solid-fill may be measured and stored in advance, or measurement may be performed upon generating a new primary-color solid-fill image.

In the calculation, firstly, the spectral reflectance is calculated, for example, in the range of the area ratio from 40 to 60 percent when the originally input area ratio is 50 percent, which is the range obtained by extending the originally input area ratio to a certain degree. Then, the obtained spectral reflectance is compared with the spectral reflectance of the streaked area, and for example, the area ratio with which the error becomes the smallest according to the calculation using least squares is determined to be the actual area ratio. Example of this comparison is described above referring to FIG. 6.

In step S5, area ratio correction data is generated using the area ratio of the streaked area calculated in step S4. As a correction formula, for example, the equation of FIG. 9 where an originally input area ratio and a calculated area ratio are used is used. FIG. 9 is a first correction formula according to the present embodiment. In this correction formula, other factors may be used.

For example, when the originally input area ratio is significantly different from the actually output area ratio due to image processing, the amount of correction may be insufficient if the correction is performed using only the input area ratio. In view of such circumstances, the average area ratio of each toner of the streak-free area may be calculated using a method similar to the method of calculating the area ratio of each toner of the streaked area, and a formula as depicted in FIG. 10 may be used. FIG. 10 is a second correction formula according to the present embodiment. The formula depicted in FIG. 10 is used to perform correction based on the area ratio obtained for the calculated streaked area and streak-free area.

Cases in which the area ratio correction data is used are not limited to cases in which specific an area ratio is to be output. For example, a single piece of correction data may be generated for multiple colors, or a different piece of correction data may be generated for each of any desired area ratios.

As a simplified version of the method of generating correction data, for example, a method in which only specific wavelength data is used from the measured spectral reflectance may be adopted. The wavelength data to be used varies according to the color. For example, when the color is green (i.e., cyan+yellow), the absorption band of each color, i.e., the reflectance of about 640 nm and 440 nm for cyan and yellow, respectively, is used.

The correction data is generated from the reflectance of streaked area and streak-free area obtained for specific wavelength, using, for example, the formula depicted in FIG. 11. FIG. 11 is a third correction formula according to the present embodiment. In a similar manner to the above, different piece of correction data may be generated for each of any desired area ratios. In step S6, the image data is corrected using the area ratio correction data generated in step S5. In step S7, the image data that is corrected in step S6 is output, for example, to the exposure device 26.

Note that the embodiments described above are preferred example embodiments of the present invention, and various applications and modifications may be made without departing from the scope of the invention.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An image forming apparatus comprising:
a processor configured to:
obtain an output image of a primary color and a secondary color that is formed on a recording medium based on an image having an area ratio of each toner being uniform over the recording medium;
obtain spectral reflectance of the output image in a main scanning direction;
obtain spectral reflectance of a primary-color solid-fill image and the recording medium stored in a memory;
calculate fluctuations in area ratio of each toner of a streaked area of the output image using the spectral reflectance of the streaked area and a streak-free area of the output image; and
correct an area ratio of each toner in the streaked area of image data to be output according to the fluctuations in area ratio.

2. The image forming apparatus according to claim 1, wherein the processor is further configured to detect the streaked area and the streak-free area in the output image, using a difference between an average of reflectance of the entire image in the main scanning direction and a reflectance of each one of a plurality of areas in the main scanning direction.

3. The image forming apparatus according to claim 1, wherein the processor is further configured to detect the streaked area and the streak-free area in the output image, using an average L*a*b* in the main scanning direction and one of a variation in L*a*b* or calculated color difference of each one of a plurality of areas in a sub-scanning direction.

4. The image forming apparatus according to claim 1, wherein the processor is further configured to detect the streaked area and the streak-free area, using a difference in reflectance among neighboring areas of a plurality of areas obtained by dividing the main scanning direction.

5. The image forming apparatus according to claim 1, wherein the processor is further configured to detect the streaked area and the streak-free area, using a variation in L*a*b* or calculated color difference among neighboring areas of a plurality of areas obtained by dividing a sub-scanning direction.

6. The image forming apparatus according to claim 1, wherein the processor determines that a target area is the streaked area when a sum of absolute values of a difference between an average reflectance in the main scanning direction and a reflectance of the target area of a plurality of areas in the main scanning direction at varying wavelengths is equal to or greater than 1.0.

7. The image forming apparatus according to claim 1, wherein the processor determines that a target area is the streaked area when a color difference ΔE between an average in the main scanning direction and the target area of a plurality of areas in the main scanning direction is equal to or greater than 3.0.

8. The image forming apparatus according to claim 1, wherein the processor determines that a target area is the streaked area when a sum of absolute values of a difference in reflectance between neighboring two areas at varying wavelengths among a plurality of areas in the main scanning direction is equal to or greater than 1.0.

9. The image forming apparatus according to claim 1, wherein the area ratio of each toner of the output image is calculated using the following formula $$R = \prod_{i=c,m,y,k} \{\alpha_i \times R_i^{1/n} + (1-\alpha_i) \times R_w^{1/n}\}^n$$

R: REFLECTANCE OF STREAKED AREA
$\alpha_c, \alpha_m, \alpha_y, \alpha_k$: AREA RATIO OF CYAN, MAGENTA, YELLOW, AND BLACK TONER
$R_c, R_m, R_y, R_k$: SPECTRAL REFLECTANCE OF CYAN, MAGENTA, YELLOW, AND BLACK SOLID-FILL
$R_w$: SPECTRAL REFLECTANCE OF RECORDING MEDIUM
n: YULE-NIELSEN FACTOR.

10. The image forming apparatus according to claim 1, wherein the image data of the streaked area is corrected using the following formula $$\alpha = \alpha_{in} \times \frac{\alpha_{in}}{\alpha_{cal}}$$

α: CORRECTED AREA RATIO
$\alpha_{in}$: ORIGINALLY INPUT AREA RATIO
$\alpha_{cal}$: CALCULATED AREA RATIO.

11. An image forming method comprising:
obtaining an output image of a primary color and a secondary color that is formed on a recording medium based on an image having an area ratio of each toner being uniform over the recording medium;
obtaining spectral reflectance of the output image in a main scanning direction;
obtaining the spectral reflectance of a primary-color solid-fill image and the recording medium stored in a memory;
calculating fluctuations in area ratio of each toner of a streaked area of the output image using the spectral reflectance of the streaked area and a streak-free area of the output image; and
correcting an area ratio of each toner in the streaked area of image data to be output according to the fluctuations in area ratio.

12. The image forming method according to claim 11, further comprising detecting the streaked area and the streak-free area in the output image, using a difference between an average of reflectance of the entire image in the main scanning direction and a reflectance of each of a plurality of areas in the main scanning direction.

13. The image forming method according to claim 11, further comprising detecting the streaked area and the streak-free area in the output image, using an average L*a*b* in the main scanning direction and one of a variation in L*a*b* or calculated color difference of each one of a plurality of areas in a sub-scanning direction.

14. The image forming method according to claim 11, further comprising detecting the streaked area and the streak-free area, using a difference in reflectance among neighboring areas of a plurality of areas obtained by dividing the main scanning direction.

15. The image forming method according to claim 11, further comprising detecting the streaked area and the streak-free area, using a variation in L*a*b* or calculated color difference among neighboring areas of a plurality of areas obtained by dividing a sub-scanning direction.

16. The image forming method according to claim 11, further comprising determining that a target area is the streaked area when a sum of absolute values of a difference between an average reflectance in the main scanning direction and a reflectance of the target area of a plurality of areas in the main scanning direction at varying wavelengths is equal to or greater than 1.0.

17. The image forming method according to claim 11, further comprising determining that a target area is the streaked when a color difference ΔE between an average in the main scanning direction and each of a plurality of areas in the main scanning direction is equal to or greater than 3.0.

18. The image forming method according to claim 11, further comprising determining that a target area is the streaked area when a sum of absolute values of a difference in reflectance between neighboring two areas at varying wavelengths among a plurality of areas in the main scanning direction is equal to or greater than 1.0.

19. The image forming method according to claim 11, wherein the area ratio of each toner of the output image is calculated using the following formula $$R = \prod_{i=c,m,y,k} \{\alpha_i \times R_i^{1/n} + (1-\alpha_i) \times R_w^{1/n}\}^n$$

R: REFLECTANCE OF STREAKED AREA $\alpha_c, \alpha_m, \alpha_y, \alpha_k$: AREA RATIO OF CYAN, MAGENTA, YELLOW, AND BLACK TONER $R_c, R_m, R_y, R_k$: SPECTRAL REFLECTANCE OF CYAN, MAGENTA, YELLOW, AND BLACK SOLID-FILL $R_w$: SPECTRAL REFLECTANCE OF RECORDING MEDIUM n: YULE-NIELSEN FACTOR.

20. The image forming method according to claim 1, wherein the image data of the streaked area is corrected using the following formula.

$$\alpha = \alpha_{in} \times \frac{\alpha_{in}}{\alpha_{cal}}$$

$\alpha$: CORRECTED AREA RATIO
$\alpha_{in}$: ORIGINALLY INPUT AREA RATIO
$\alpha_{cal}$: CALCULATED AREA RATIO.

* * * * *